United States Patent [19]

Pluenneke

[11] 4,166,340

[45] Sep. 4, 1979

[54] POT LINING METHOD WITH RECLAIMED TIRE FIBERS

[76] Inventor: Ricks H. Pluenneke, Rte. 7, Box 441E, Fort Worth, Tex. 76119

[21] Appl. No.: 846,022

[22] Filed: Oct. 27, 1977

Related U.S. Application Data

[63] Continuation of Ser. No. 658,920, Feb. 18, 1976, abandoned.

[51] Int. Cl.$^2$ ............................................. A01G 9/00
[52] U.S. Cl. ........................................... 47/58; 47/9; 47/66; 47/81
[58] Field of Search ...................... 47/66, 58, 79, 9, 81; 241/DIG. 31, 24

[56] References Cited

U.S. PATENT DOCUMENTS

| | | | |
|---|---|---|---|
| 640,077 | 12/1899 | Bagby | 47/79 X |
| 1,264,096 | 4/1918 | LeLievre | 47/81 |
| 1,450,633 | 4/1923 | Hudson | 47/81 |
| 2,126,672 | 8/1938 | Smith et al. | 241/DIG. 31 X |
| 2,471,043 | 5/1949 | Schenck | 241/DIG. 31 X |
| 2,814,161 | 11/1957 | Hawkins | 47/66 |
| 3,766,685 | 10/1973 | Nickerson et al. | 47/58 X |
| 3,866,352 | 2/1975 | Herveling et al. | 47/66 |
| 3,958,365 | 5/1976 | Proctor | 47/66 |
| 3,966,125 | 6/1976 | Finkbeiner | 241/24 X |

FOREIGN PATENT DOCUMENTS

| | | | |
|---|---|---|---|
| 1230052 | 9/1960 | France | 47/81 |
| 1104 | of 1875 | United Kingdom | 47/81 |

OTHER PUBLICATIONS

"Tire Fabric Waste as Mulch for Fruit Trees", J. Amer. Soc. Hort. Sci. 100(2): 153–157, Mar. 1975.
"Scrape Tires Can Yield Marketable Products", Environmental Science & Technology, 188–190, Mar. 1973.

*Primary Examiner*—Edgar S. Burr
*Assistant Examiner*—Steven A. Bratlie
*Attorney, Agent, or Firm*—Cushman, Darby & Cushman

[57] ABSTRACT

A method of potting plants to optimize the environmental growth conditions thereof, and a combination that results from the practice of the method. A plurality of loose fibers comprising the fiber fraction from the break up of used tires which fiber fraction is normally a disposal problem is placed in the interior of a pot adjacent to the bottom thereof. Soil and the roots of the plant being potted are disposed over the loose fibers and a combination results including the pot, loose fibers, soil and plant. The loose fibers from the break up of used tires prevents the loss of soil through drainage holes in the bottom of the pot while providing for proper drainage, provide micronutrients and otherwise provide optimum growth conditions for the potted plant. Thus, worthwhile use is made of an otherwise worthless product.

4 Claims, 2 Drawing Figures

POT LINING METHOD WITH RECLAIMED TIRE FIBERS

This is a continuation of application Ser. No. 658,920 filed Feb. 18, 1976, now abandoned.

BACKGROUND AND SUMMARY OF THE INVENTION

The invention relates to a method of potting plants and to the combination that results therefrom. In order to insure optimum growing conditions for potted plants, it is desirable that proper drainage of water in the pots is provided so that the plant roots do not die and rot. In the past this has been accomplished by disposing rocks, pieces of broken clay pottery or vermiculite or the like on the pot bottom, or by disposing non-woven or woven substrates on the pot bottom (for example, see U.S. Pat. Nos. 3,866,352 and 3,675,368). In general, the materials that have been used for this purpose are materials that are otherwise useful for some other purpose and thus, are relatively valuable materials. These are materials which do not perform a wide variety of other functions when so used.

When used tires are broken up for disposal and reclamation of any valuable materials that might be contained therein, generally three components result, a rubber fraction, a metal fraction and a fiber fraction. The fiber fraction consists mainly of nylon, rayon and cotton fibers. The fibers essentially are less than half an inch long. Until the present invention, there has been little value in this fiber fraction; rather the fiber fraction was often a disposal problem.

According to the present invention, a material that is not valuable as a material that otherwise is a disposal problem, having little or no value for use in anything else, is utilized for plant potting. The material is effective to provide proper drainage of water through a pot while keeping the soil within and also accomplishes a wide variety of other functions for optimizing a potted plant environment. According to the present invention, a plurality of loose fibers comprising the fiber fraction from the break up of used tires is disposed in the interior of a pot, adjacent to the bottom thereof. The soil and the roots of the plant to be potted are disposed on top of this fiber fraction.

When the fiber fraction from the break up of used tires is utilized according to the teachings of the present invention, in addition to optimum drainage conditions for the potted plant being provided, there are many other advantageous results that ensue. For instance, the fiber fraction prevents the loss of soil through drainage holes in the bottom of the pot, provides a cushion for the plant's roots in case the pot is handled roughly after potting and provides a large variety of micronutrients to assist in optimizing the plant growing conditions.

It is the primary object of the present invention to provide optimum growing conditions for potted plants while simultaneously utilizing a heretofore worthless product. This and other objects of the invention will become clear from an inspection of the detailed description of the invention and from the appended claims.

DETAILED DESCRIPTION OF THE INVENTION

Figure 1:
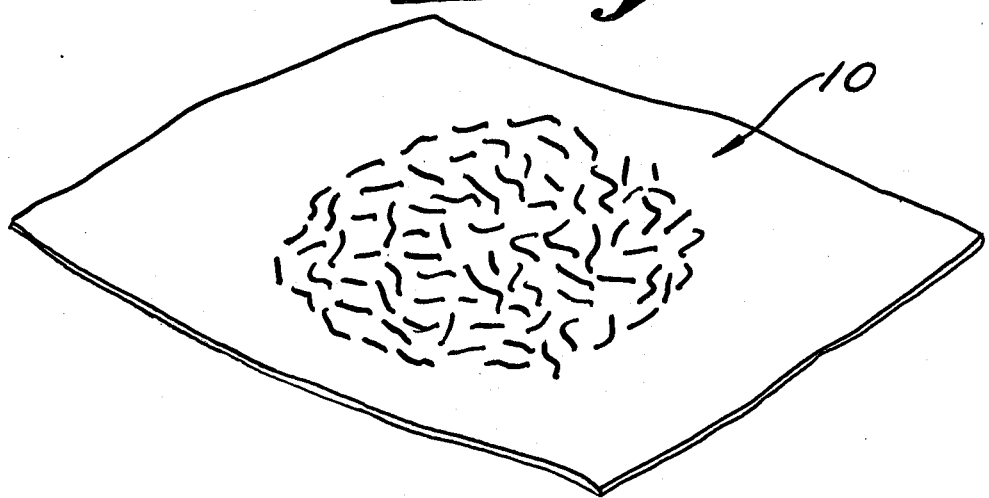
FIG. 1 is a schematic view of a plurality of fibers comprising the fiber fraction from used tire break up.

Exemplary fibers of the fiber fraction resulting from used tire break up are shown generally at 10 in FIG. 1. These fibers generally are of cotton, nylon, rayon and of varying proportions depending upon the particular composition of the tires that have been broken up. Generally, a small amount of rubber surrounds portions of the nylon, rayon and cotton fibers whose fibers are usually less than half an inch long. The combination of the impurities (i.e., rubber) with the fibers and the shortness thereof, makes them essentially worthless for any conventional use to which nylon, cotton or rayon fibers might be put and they are a disposal problem.

Figure 2:
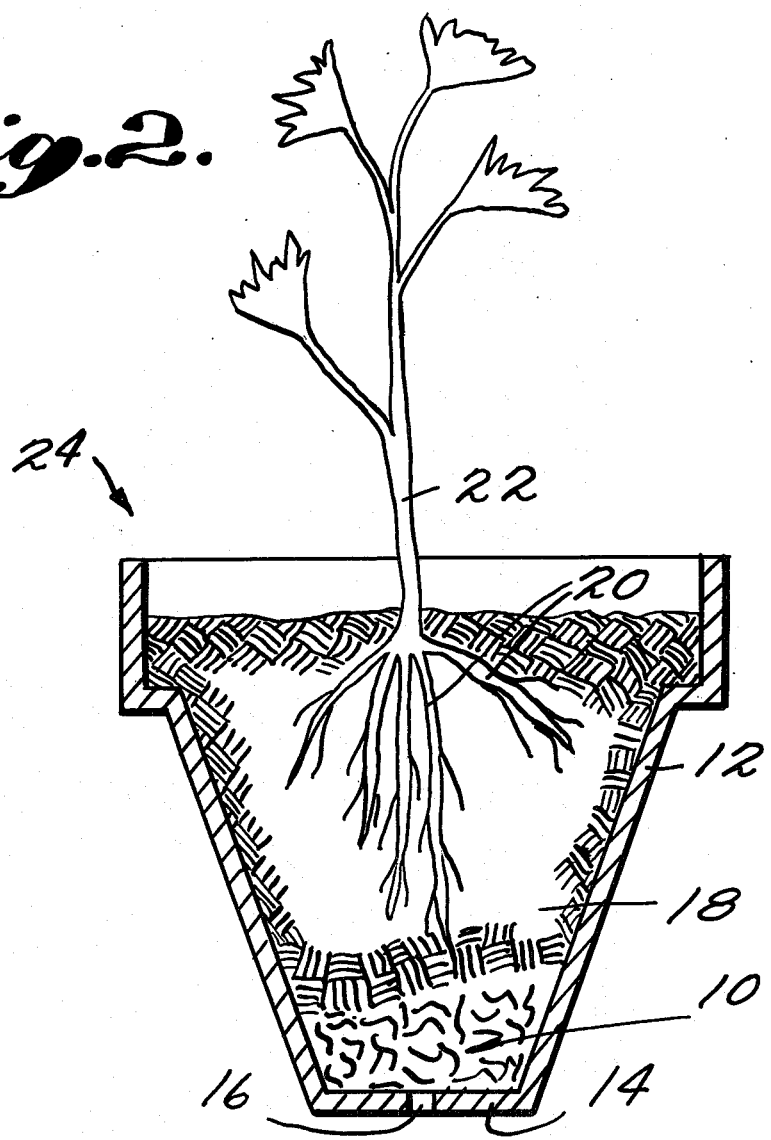
FIG. 2 is a schematic cross-sectional view of an exemplary potted plant combination according to the present invention.

According to the method of the present invention, the fibers 10 are put to a worthwhile use, providing for the optimization of the environmental conditions for potted plants. According to the method of the present invention, as shown with respect to FIG. 2, a plurality of loose fibers 10 are disposed in the interior of a pot 12, such as a clay pot or the like, adjacent to the bottom portion 14 of the pot 12. If the pot 12 has one or more drainage holes 16 disposed in the bottom 14 thereof, the loose fibers 10 are disposed directly over the drainage hole(s) 16. Then some soil 18 (the word "soil" in the present specification and claims is intended to include all types of conventional plant growing mediums) is disposed on top of the loose fibers 10, as well as the roots 20 of a plant 22 that is to be potted. A combination 24 that results includes the pot 12, the loose fibers 10 disposed in the interior of the pot 12 adjacent to the bottom portion 14 thereof, soil 18 and the roots 20 of a potted plant 22.

The loose fibers 10, according to the present invention, in addition to providing for proper drainage of water in the combination 24 also provides a cushion for the roots 20 and the pot bottom 14 in case the pot 12 is subjected to rough handling after potting of the plant 22, prevent the leakage of soil 18 through the drainage hole(s) 16 in the pot bottom 14, and provide valuable micronutrients for the plant 22. While the composition of the fibers 10 will vary from sample to sample, a typical representation of the micronutrient composition thereof is as follows:

| Micronutrient | Parts/million |
|---|---|
| Sulphur | 5700 |
| Iron | 230 |
| Zinc | 5300 |
| Manganese | 20 |
| Copper | trace |
| Boron | trace |
| Molybdenum | trace |

Fibers 10 that are utilized according to the present invention may be obtained as a waste product from any processing concern dealing in the break up of used tires, such as U.S. Rubber ReClaiming, Inc., Vicksburg, Mississippi.

It will thus be seen that according to the present invention a method and combination have been provided which results in the utilization of a product that heretofore was a disposal problem to provide an optimal growth environment for potted plants. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and combinations.

What is claimed is:

1. A method for potting a live plant comprising the steps of
    disposing a plurality of loose fibers comprising the fiber fraction from used tire break up in the interior of a pot adjacent to, and at least in partial contact with, the bottom thereof, and
    placing soil and the roots of a plant to be potted on top of the loose fibers of the used tire fiber fraction.

2. A method as recited in claim 1 wherein the pot has at least one drainage hole in the bottom thereof, and comprising the further step of disposing said loose fibers directly over said drainage hole.

3. A combination comprising
    a plant pot,
    a plurality of loose fibers comprising the fiber fraction from used tire break up in the interior of said pot adjacent to, and at least in partial contact with, the bottom thereof,
    soil disposed over said loose fibers, and
    a plant and the roots thereof disposed over said loose fibers and at least in part disposed in said soil.

4. A combination as recited in claim 3 wherein said pot has at least one drainage hole in the bottom thereof, and wherein said plurality of loose fibers are disposed directly over said drainage hole in the pot bottom.

* * * * *